US012630748B2

(12) United States Patent
Park et al.

(10) Patent No.: US 12,630,748 B2
(45) **Date of Patent: *May 19, 2026**

(54) PRESSURE-SENSITIVE ADHESIVE

(71) Applicant: LG CHEM, LTD., Seoul (KR)

(72) Inventors: Byung Su Park, Daejeon (KR); Hyun Cheol Kim, Daejeon (KR); Hui Je Lee, Daejeon (KR); Seung Yeon Ryu, Daejeon (KR); Jin Ho Son, Daejeon (KR)

(73) Assignee: Xinmei Fontana Holding (Hong Kong) Limited, Hong Kong (CN)

( * ) Notice: Subject to any disclaimer, the term of this patent is extended or adjusted under 35 U.S.C. 154(b) by 526 days.

This patent is subject to a terminal disclaimer.

(21) Appl. No.: 18/255,998

(22) PCT Filed: Feb. 15, 2022

(86) PCT No.: PCT/KR2022/002781

§ 371 (c)(1),
(2) Date: Jun. 5, 2023

(87) PCT Pub. No.: WO2022/182193

PCT Pub. Date: Sep. 1, 2022

(65) Prior Publication Data

US 2024/0301251 A1 Sep. 12, 2024

(30) Foreign Application Priority Data

Feb. 26, 2021 (KR) ........................ 10-2021-0026662

(51) Int. Cl.

*C09J 7/38* (2018.01)
*C09J 133/08* (2006.01)

(52) U.S. Cl.

CPC ............ *C09J 7/385* (2018.01); *C09J 133/08* (2013.01); *C09J 2301/302* (2020.08); (Continued)

(58) Field of Classification Search

None
See application file for complete search history.

(56) References Cited

U.S. PATENT DOCUMENTS

2013/0123417 A1* 5/2013 Takarada ............... C09J 133/08 526/264
2013/0123450 A1 5/2013 Takarada et al.
(Continued)

FOREIGN PATENT DOCUMENTS

JP 2004-002684 A 1/2004
KR 2013-0051901 A 5/2013
(Continued)

OTHER PUBLICATIONS

Machine-generated English language translation of KR-101955755-B1 (no date).*
(Continued)

*Primary Examiner* — Fred M Teskin
(74) *Attorney, Agent, or Firm* — Ricky Lam

(57) ABSTRACT

A pressure-sensitive adhesive, which is applied to a flexible device, thereby effectively responding to repeated deformation and recovery, causing no defects (for example, observation of deformation traces and the like) before and after deformation, having excellent cuttability and workability, and causing no lifting, delamination, and/or bubble generation, and a use thereof are provided.

13 Claims, 1 Drawing Sheet

(52) U.S. Cl.
CPC .... *C09J 2301/312* (2020.08); *C09J 2301/414* (2020.08); *C09J 2433/00* (2013.01); *C09J 2467/006* (2013.01)

(56) References Cited

U.S. PATENT DOCUMENTS

| | | | | |
|---|---|---|---|---|
| 2020/0255704 | A1 | 8/2020 | Lee et al. | |
| 2020/0255705 | A1 | 8/2020 | Lee | |
| 2021/0340414 | A1 | 11/2021 | Song et al. | |
| 2023/0048574 | A1 | 2/2023 | Han et al. | |
| 2024/0301251 | A1* | 9/2024 | Park | C09J 7/385 |

FOREIGN PATENT DOCUMENTS

| | | | | |
|---|---|---|---|---|
| KR | 2016-0019079 | A | 2/2016 | |
| KR | 2016-0076977 | A | 7/2016 | |
| KR | 2016-0084569 | A | 7/2016 | |
| KR | 10-1955755 | B1 * | 3/2019 | C09J 11/08 |
| KR | 10-2027569 | B1 | 10/2019 | |
| KR | 10-2069481 | B1 | 1/2020 | |
| KR | 2020-0085130 | A | 7/2020 | |
| KR | 2020-0097136 | A | 8/2020 | |
| KR | 2020-0097137 | A | 8/2020 | |

OTHER PUBLICATIONS

International Search Report and Written Opinion issued for International Application No. PCT/KR2022/002781 on Jun. 9, 2022, 14 pages.

* cited by examiner

PRESSURE-SENSITIVE ADHESIVE

TECHNICAL FIELD

This application is a 35 U.S.C. 371 National Phase Entry Application from PCT/KR2022/002781 filed on Feb. 25, 2022, which claims priority based on Korean Patent Application No. 10-2021-0026662 filed on Feb. 26, 2021, the disclosures of which are incorporated herein by reference in their entirety.

The present application relates to a pressure-sensitive adhesive.

BACKGROUND OF THE INVENTION

A flexible device is a new conceptual device, and in an example thereof, a so-called foldable device or rollable device is included.

The pressure-sensitive adhesive layer applied to the foldable device is repeatedly folded and then unfolded, or wound and then unwound.

Therefore, the layer applied to the foldable device is required to be capable of effectively following the repeated deformation, and recovering to its original shape when the force applied during the deformation disappears.

In general, it is known that the lower the elastic modulus of the pressure-sensitive adhesive, particularly, the lower the elastic modulus at a low temperature, the more effectively it is to follow the repeated deformation as above.

However, when the elastic modulus of the pressure-sensitive adhesive layer is too low, there are problems that the property of recovering when the force applied for deformation disappears is deteriorated, and the cuttability and workability are deteriorated.

Therefore, in consideration of cuttability or workability, it may be preferable that the pressure-sensitive adhesive layer has an elastic modulus of a certain level or more, but it is not easy to obtain a pressure-sensitive adhesive layer that effectively follows deformation while securing the desired level of recovery properties, cuttability and workability, and the like.

In addition, when the elastic modulus is increased in consideration of cuttability or workability, there is a problem that the peel force basically required for the pressure-sensitive adhesive layer is lowered.

Therefore, it is an uneasy task to provide a pressure-sensitive adhesive layer having physical properties suitable for a flexible device.

BRIEF SUMMARY OF THE INVENTION

The present application relates to a pressure-sensitive adhesive. It is one object of the present application to provide a pressure-sensitive adhesive suitable for a foldable device. In one example, it is one object of the present application to provide a pressure-sensitive adhesive capable of forming a pressure-sensitive adhesive layer that exhibits a relatively high elastic modulus at a high temperature while exhibiting a low elastic modulus suitable for a foldable device at a low temperature, and simultaneously exhibits an appropriate level of adhesive force (peel force).

It is another object of the present application to provide a pressure-sensitive adhesive film or a flexible device comprising the pressure-sensitive adhesive.

Among the physical properties mentioned in this specification, when the measured temperature affects the relevant physical property, the physical property is a physical property measured at room temperature, unless otherwise specified.

In this specification, the term room temperature is a temperature in a state where it is not particularly warmed and cooled, which may mean any one temperature within the range of about 10° C. to 30° C., for example, a temperature of about 27° C. or less while being about 15° C. or more, 18° C. or more, 20° C. or more, or about 23° C. or more. In addition, unless otherwise specified, the unit of temperature mentioned in this specification is ° C.

Among the physical properties mentioned in this specification, when the measured pressure affects the relevant physical property, the physical property is a physical property measured at normal pressure, unless otherwise specified.

In this specification, the term normal pressure is a pressure in a state where it is not particularly pressurized and depressurized, which usually means a pressure of about 740 mmHg to 780 mmHg or so, which is the atmospheric pressure level.

Among the physical properties mentioned in this specification, when the measured humidity affects the relevant physical property, the physical property is a physical property measured at natural humidity in the state of the room temperature and normal pressure, unless otherwise specified.

The present application relates to a pressure-sensitive adhesive. The pressure-sensitive adhesive of the present application may comprise an acrylic copolymer.

In this specification, the term copolymer means a resulting product of a polymerization reaction of a monomer mixture.

In this specification, the term monomer unit means the state of the monomer after the polymerization reaction.

In this specification, the term acrylic copolymer is a copolymer comprising an acrylic monomer unit as a main component. At this time, the main component means, in the acrylic copolymer, a case where the ratio of the acrylic monomer unit is 50 weight % or more, 55 weight % or more, 60 weight % or more, 65 weight % or more, 70 weight % or more, 75 weight % or more, 80 weight % or more, 85 weight % or more, 90 weight % or more, or 95 weight % or more. There is no particular limitation on the upper limit of the content of the acrylic monomer unit in the acrylic copolymer. For example, the acrylic copolymer may comprise 100 weight % or less, 99 weight % or less, 98 weight % or less, 97 weight % or less, 96 weight % or less, or 95 weight % or less of the acrylic monomer unit.

In this specification, the term acrylic monomer means acrylic acid or methacrylic acid, or a derivative of the acrylic acid or methacrylic acid (e.g., acrylic acid ester or methacrylic acid ester).

In this specification, the term (meth)acryl means acryl or methacryl.

When the acrylic copolymer is cross-linkable in the pressure-sensitive adhesive of the present application, the acrylic copolymer may be in a state before cross-linking or after cross-linking, and may suitably be in a cross-linked state. Therefore, the pressure-sensitive adhesive may comprise the cross-linked acrylic copolymer.

The pressure-sensitive adhesive may comprise the acrylic copolymer as the main component. For example, the ratio of the acrylic copolymer in the pressure-sensitive adhesive may be 50 weight % or more, 55 weight % or more, 60 weight % or more, 65 weight % or more, 70 weight % or more, 75 weight % or more, 80 weight % or more, 85 weight % or more, 90 weight % or more, 95 weight % or more, 97 weight % or more, or 99 weight % or more or so. There is no particular limitation on the upper limit of the content of the acrylic copolymer in the pressure-sensitive adhesive. For example, the acrylic copolymer may be included in the pressure-sensitive adhesive in an amount of 100 weight % or less, 99 weight % or less, 98 weight % or less, 97 weight % or less, 96 weight % or less, or 95 weight % or less or so. When the pressure-sensitive adhesive comprises a component, such as a solvent or a thinner, that is not included in the final pressure-sensitive adhesive layer, the content of the acrylic copolymer is the content in the pressure-sensitive adhesive excluding the component not included in the final pressure-sensitive adhesive layer.

The storage elastic modulus and peel force of the pressure-sensitive adhesive mentioned in this specification are the storage elastic modulus and peel force in a state where the pressure-sensitive adhesive composition is cross-linked (that is, the acrylic copolymer included in the pressure-sensitive adhesive composition is cross-linked), which may thus be the storage elastic modulus and peel force of the pressure-sensitive adhesive or pressure-sensitive adhesive layer.

The pressure-sensitive adhesive of the present application may exhibit a low storage elastic modulus at a low temperature.

In this specification, the storage elastic modulus is a result measured in the manner presented in the following examples.

For example, the pressure-sensitive adhesive may have a storage elastic modulus at −20° C. of 100,000 Pa or less. In another example, the storage elastic modulus of the pressure-sensitive adhesive at −20° C. may also be 98,000 Pa or less, 96,000 Pa or less, 95,000 Pa or less, 94,000 Pa or less, 93,000 Pa or less, 92,000 Pa or less, 90,000 Pa or less, 88,000 Pa or less, 86,000 Pa or less, 85,000 Pa or less, 84,000 Pa or less, 83,000 Pa or less, 82,000 Pa or less, 80,000 Pa or less, 78,000 Pa or less, 76,000 Pa or less, 74,000 Pa or less, 72,000 Pa or less, 70,000 Pa or less, 68,000 Pa or less, 66,000 Pa or less, 64,000 Pa or less, 62,000 Pa or less, 60,000 Pa or less, 58,000 Pa or less, 56,000 Pa or less, or 54,000 Pa or less or so. The lower limit of the storage elastic modulus at −20° C. is not particularly limited, and for example, may be 30,000 Pa or more, 40,000 Pa or more, 42,000 Pa or more, 44,000 Pa or more, 45,000 Pa or more, 46,000 Pa or more, 48,000 Pa or more, 50,000 Pa or more, 52,000 Pa or more, 54,000 Pa or more, 55,000 Pa or more, 56,000 Pa or more, 58,000 Pa or more, 60,000 Pa or more, 62,000 Pa or more, 64,000 Pa or more, 65,000 Pa or more, 66,000 Pa or more, 68,000 Pa or more, 70,000 Pa or more, 72,000 Pa or more, 74,000 Pa or more, 75,000 Pa or more, 76,000 Pa or more, 78,000 Pa or more, 80,000 Pa or more, 82,000 Pa or more, 84,000 Pa or more, 86,000 Pa or more, 88,000 Pa or more, 90,000 Pa or more, 92,000 Pa or more, 94,000 Pa or more, or 96,000 Pa or more or so.

By exhibiting the storage elastic modulus of the above range at −20° C., which is a relatively low temperature, the pressure-sensitive adhesive can be applied to a flexible device to effectively respond to repeated deformation and recovery.

The pressure-sensitive adhesive of the present application may exhibit a low storage elastic modulus as above at a low temperature and simultaneously exhibit a high storage elastic modulus of a certain level or more at a relatively high temperature. The storage elastic modulus of the pressure-sensitive adhesive is a temperature-dependant function, and usually, when the temperature increases, the storage elastic modulus decreases. Therefore, the storage elastic modulus of the pressure-sensitive adhesive at high temperatures is usually lower than the storage elastic modulus at low temperatures. However, when the pressure-sensitive adhesive has a low storage elastic modulus at a low temperature, the storage elastic modulus at a high temperature is also relatively lowered, so that the storage elastic modulus at a high temperature of the pressure-sensitive adhesive having a low storage elastic modulus at a low temperature is lower than the storage elastic modulus at a high temperature of the pressure-sensitive adhesive having a high storage elastic modulus at a low temperature.

However, in the present application, it may exhibit a relatively high storage elastic modulus at a high temperature together with the low storage elastic modulus at a low temperature. That is, the pressure-sensitive adhesive of the present application may exhibit a relatively gentle slope in the graph of the storage elastic modulus according to temperature.

For example, the pressure-sensitive adhesive of the present application may have an elastic modulus change rate of 2500 or less according to Equation 1 below.

$$\text{Elastic modulus change rate} = (M_{20} - M_{25})/45 \quad \text{[Equation 1]}$$

In Equation 1, $M_{20}$ is the storage elastic modulus (unit: Pa) of the pressure-sensitive adhesive at −20° C., and $M_{25}$ is the storage elastic modulus (unit: Pa) of the pressure-sensitive adhesive at 25° C.

The elastic modulus change rate may be 2400 or less, 2300 or less, 2200 or less, 2100 or less, 2000 or less, 1900 or less, 1800 or less, 1700 or less, 1600 or less, 1500 or less, 1400 or less, 1300 or less, 1200 or less, 1100 or less, 1000 or less, 900 or less, or 800 or less or so. The lower limit of the elastic modulus change rate is not particularly limited, and for example, the change rate may also be 100 or more, 200 or more, 300 or more, 400 or more, 500 or more, 600 or more, 700 or more, 800 or more, 900 or more, 1000 or more, 1100 or more, 1200 or more, 1300 or more, or 1400 or more or so.

The pressure-sensitive adhesive layer exhibiting such an elastic modulus change rate can effectively follow the repeated deformation and recovery in a foldable device, and maintain excellent workability and cuttability. However, as described above, the pressure-sensitive adhesive having a low elastic modulus at a low temperature exhibits a relatively low elastic modulus even at a high temperature, so that it is an uneasy task to satisfy the elastic modulus change rate. In the present application, by applying a predetermined acrylic copolymer to be described below as the acrylic copolymer, it is possible to satisfy such an elastic modulus change rate.

The storage elastic modulus of the pressure-sensitive adhesive at 25° C. may be 10,000 Pa or more. In another example, the storage elastic modulus at 25° C. may also be 12,000 Pa or more, 13,000 Pa or more, 14,000 Pa or more, 15,000 Pa or more, 16,000 Pa or more, 17,000 Pa or more, 18,000 Pa or more, 20,000 Pa or more, 21,000 Pa or more, 22,000 Pa or more, 23,000 Pa or more, 24,000 Pa or more, 26,000 Pa or more, 28,000 Pa or more, 30,000 Pa or more, 32,000 Pa or more, 34,000 Pa or more, 36,000 Pa or more, 38,000 Pa or more, or 40,000 Pa or more or so. The upper limit of the storage elastic modulus at 25° C. is not particularly limited, but the elastic modulus may also be, for example, about 100,000 Pa or less, 98,000 Pa or less, 96,000

Pa or less, 94,000 Pa or less, 92,000 Pa or less, 90,000 Pa or less, 88,000 Pa or less, 86,000 Pa or less, 84,000 Pa or less, 82,000 Pa or less, 80,000 Pa or less, 78,000 Pa or less, 76,000 Pa or less, 74,000 Pa or less, 72,000 Pa or less, 70,000 Pa or less, 68,000 Pa or less, 66,000 Pa or less, 64,000 Pa or less, 62,000 Pa or less, 60,000 Pa or less, 58,000 Pa or less, 56,000 Pa or less, 54,000 Pa or less, 52,000 Pa or less, 50,000 Pa or less, 48,000 Pa or less, 46,000 Pa or less, 44,000 Pa or less, 42,000 Pa or less, 40,000 Pa or less, 38,000 Pa or less, 36,000 Pa or less, 35,000 Pa or less, 34,000 Pa or less, 32,000 Pa or less, 30,000 Pa or less, 28,000 Pa or less, 26,000 Pa or less, 25,000 Pa or less, 24,000 Pa or less, 22,000 Pa or less, 20,000 Pa or less, or 18,000 Pa or less or so.

The pressure-sensitive adhesive of the present application may exhibit a relatively high high-temperature elastic modulus as above and simultaneously exhibit a high peel force. For example, the pressure-sensitive adhesive may have a room-temperature peel force of about 500 gf/inch or more to glass.

The room-temperature peel force is a peel force measured at approximately 25° C., and a method for measuring this peel force is described in Examples.

In another example, the peel force may also be 600 gf/inch or more, 700 gf/inch or more, 800 gf/inch or more, 900 gf/inch or more, 1000 gf/inch or more, 1100 gf/inch or more, 1200 gf/inch or more, 1300 gf/inch or more, 1400 gf/inch or more, 1450 gf/inch or more, 1500 gf/inch or more, 1550 gf/inch or more, 1600 gf/inch or more, or 1700 gf/inch or more or so. There is no particular limitation on the upper limit of the room-temperature peel force, and for example, the room-temperature peel force may also be 5000 gf/inch or less, 4500 gf/inch or less, 4000 gf/inch or less, 3500 gf/inch or less, 3000 gf/inch or less, 2800 gf/inch or less, 2600 gf/inch or less, 2500 gf/inch or less, 2400 gf/inch or less, 2200 gf/inch or less, 2000 gf/inch or less, 1800 gf/inch or less, 1600 gf/inch or less, or 1500 gf/inch or less or so.

The pressure-sensitive adhesive having such storage elastic modulus and peel force is applied to a flexible device, thereby effectively responding to repeated deformation and recovery, causing no defects (e.g., observation of deformation traces, etc.) before and after deformation, having excellent cuttability and workability, and causing no lifting, delamination and/or bubble generation.

In the present application, a specific acrylic copolymer is applied to form such a pressure-sensitive adhesive having specific physical properties.

The acrylic copolymer may comprise at least an alkyl (meth)acrylate unit, a unit of Formula 1 below, and a polar functional group-containing unit. The copolymer may further comprise a unit of Formula 2 below as an optional monomer unit, if necessary.

Here, the unit means a monomer unit.

[Formula 1]

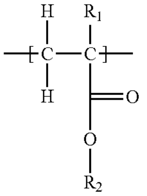

In Formula 1, $R_1$ represents hydrogen or an alkyl group, and $R_2$ represents an alkyl group with 11 to 13 carbon atoms.

[Formula 2]

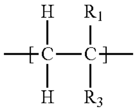

In Formula 2, $R_1$ represents hydrogen or an alkyl group, and $R_3$ represents an aromatic ketone group or a (meth) acryloyl group.

The acrylic copolymer comprising the monomer units is effective in forming a desired pressure-sensitive adhesive.

The acrylic copolymer is formed as a so-called crystalline copolymer under a predetermined ratio of the unit of Formula 1 above and/or the polar functional group-containing unit, or has properties similar to those of the crystalline copolymer. In this specification, the term crystalline copolymer means a copolymer whose melting point is identified in a predetermined range in the DSC (Differential Scanning calorimeter) measurement method described in Examples of this specification.

The acrylic copolymers are known as amorphous copolymers. However, when the unit of Formula 1 above is present in a predetermined ratio, and in some cases, when the unit of Formula 1 above interacts with the polar functional group present in a predetermined ratio, such a copolymer may exhibit crystallinity, or may exhibit at least properties similar to crystallinity. As such, when a copolymer having crystallinity or exhibiting properties similar to crystallinity is applied, the pressure-sensitive adhesive having the above-described properties can be efficiently formed. Therefore, it is possible to effectively form a pressure-sensitive adhesive layer exhibiting the above-described elastic modulus and peel force characteristics through the pressure-sensitive adhesive to which such a copolymer is applied.

As the alkyl (meth)acrylate unit contained in the copolymer, for example, a unit derived from an alkyl (meth) acrylate having an alkyl group with 1 to 10 carbon atoms may be used. In another example, the alkyl group may be an alkyl group with 2 to 20 carbon atoms, 3 to 10 carbon atoms, 4 to 10 carbon atoms, 4 to 9 carbon atoms, or 4 to 8 carbon atoms. The alkyl group may be linear or branched, which may be substituted or unsubstituted. In one example, the unit may be formed using an alkyl (meth)acrylate having an unsubstituted alkyl group while being linear or branched as the alkyl group.

An example of the alkyl (meth)acrylate may be exemplified by methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, isononyl (meth)acrylate, n-octyl (meth)acrylate or isooctyl (meth)acrylate, and the like, but is not limited thereto.

The acrylic copolymer may comprise the alkyl (meth) acrylate unit in a ratio within a range of about 10 to 80 weight %. In another example, the ratio of the alkyl (meth) acrylate unit may be 15 weight % or more, 20 weight % or more, 25 weight % or more, 30 weight % or more, 35 weight % or more, 40 weight % or more, 45 weight % or more, 50 weight % or more, or 55% or more, or may also be 75 weight % or less, 70 weight % or less, 65 weight % or less, 60 weight % or less, 55 weight % or less, 50 weight % or less, 45 weight % or less, 40 weight % or less, or 35 weight % or less or so. Within this range, a desired pressure-sensitive adhesive may be effectively formed.

The polar functional group-containing unit is a unit formed of a monomer having a polar functional group. Such a monomer usually comprises a polymerizable group (e.g., a carbon-carbon double bond) and a polar functional group simultaneously.

The monomer having a polar functional group may include a hydroxyl group-containing monomer, a carboxyl group-containing monomer, and a nitrogen-containing monomer, and the like, ad in the present application, it is particularly advantageous to apply a hydroxyl group-containing monomer, but is not limited thereto.

The hydroxyl group-containing monomer may include 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxypolyethylene glycol (meth)acrylate, or 2-hydroxypolypropylene glycol (meth)acrylate, and the like: an example of the carboxyl group-containing monomer may include (meth) acrylic acid, 2-(meth)acryloyloxyacetic acid, 3-(meth)acryloyloxypropyl acid, 4-(meth)acryloyloxybutyric acid, acrylic acid dimer, itaconic acid, maleic acid and maleic acid anhydride, and the like; and an example of the nitrogen-containing monomer may include (meth)acrylamide, N-vinyl pyrrolidone, or N-vinyl caprolactam, and the like, without being limited thereto. One or a mixture of two or more of the foregoing may be used.

The polar functional group-containing unit may be included in the acrylic copolymer in a ratio of approximately 5 to 100 parts by weight relative to 100 parts by weight of the alkyl (meth)acrylate unit, and under this ratio, it is possible to stably maintain the durability, tackiness and peel force of the pressure-sensitive adhesive layer. In another example, the polar functional group-containing unit may be included in an amount of 10 parts by weight or more, 15 parts by weight or more, 20 parts by weight or more, 25 parts by weight or more, 30 parts by weight or more, 35 parts by weight or more, 40 parts by weight or more, 45 parts by weight or more, or 50 parts by weight or more, or may also be included in an amount of 95 parts by weight or less, 90 parts by weight or less, 85 parts by weight or less, 80 parts by weight or less, 75 parts by weight or less, 70 parts by weight or less, 65 parts by weight or less, 60 parts by weight or less, 55 parts by weight or less, 50 parts by weight or less, 45 parts by weight or less, 40 parts by weight or less, 35 parts by weight or less, 30 parts by weight or less, 25 parts by weight or less, or 20 parts by weight or less, relative to 100 parts by weight of the alkyl (meth)acrylate unit.

The unit of Formula 1 is a unit containing a long-chain alkyl group, and such a unit is included in the copolymer in a certain ratio or more, and interacts with a polar functional group as necessary, whereby it is possible to impart crystallinity or properties similar to crystallinity to the copolymer.

In the unit of Formula 1, $R_1$ may be hydrogen or an alkyl group with 1 to 4 carbon atoms, and may be specifically hydrogen, or a methyl or ethyl group.

In Formula 1, $R_2$ is an alkyl group with 11 to 13 carbon atoms, where such an alkyl group may be linear or branched, and may be substituted or unsubstituted. In one example, the $R_2$ may be an unsubstituted alkyl group while being linear. For example, the unit of Formula 1 may be formed using lauryl (meth)acrylate and/or tetradecyl (meth)acrylate, and the like.

The unit of Formula 1 may be included in the acrylic copolymer in a ratio of approximately 50 to 300 parts by weight relative to 100 parts by weight of the alkyl (meth) acrylate unit. In another example, the ratio of the unit of Formula 1 may be about 55 parts by weight or more, 60 parts by weight or more, 65 parts by weight or more, 70 parts by weight or more, 75 parts by weight or more, 80 parts by weight or more, 85 parts by weight or more, 90 parts by weight or more, 95 parts by weight or more, 100 parts by weight or more, 105 parts by weight or more, 110 parts by weight or more, 115 parts by weight or more, 120 parts by weight or more, 125 parts by weight or more, 130 parts by weight or more, 135 parts by weight or more, or 140 parts by weight or more, or may also be 280 parts by weight or less, 260 parts by weight or less, 240 parts by weight or less, 220 parts by weight or less, 200 parts by weight or less, 180 parts by weight or less, 160 parts by weight or less, 140 parts by weight or less, 120 parts by weight or less, 100 parts by weight or less, 90 parts by weight or less, 80 parts by weight or less, 70 parts by weight or less, or 65 parts by weight or less or so, relative to 100 parts by weight of the alkyl (meth)acrylate unit.

The unit of Formula 2 that may be included as an optional monomer unit in the acrylic copolymer is a unit comprising an aromatic ketone group or a (meth)acryloyl group in a side chain.

The aromatic ketone group or (meth)acryloyl group in the pressure-sensitive adhesive may exist as such, or may also exist in a state after undergoing a hydrogen removal reaction or radical reaction described below.

The aromatic ketone group in the unit of Formula 2 means an aromatic ketone group that induces hydrogen removal (hydrogen abstraction) from a polymer chain when exposed to electromagnetic waves, or a substituent containing such an aromatic ketone group.

When exposed to electromagnetic waves, the aromatic ketone group can remove hydrogen atoms from other polymer chains or from other parts of the polymer chain. This removal results in the formation of radicals, where the radicals can form cross-links between polymer chains or within the same polymer chain. In the category of such aromatic ketone groups, for example, aromatic ketone groups such as derivatives of benzophenone, acetophenone, or anthraquinone are included.

The monomer capable of deriving the unit of Formula 2 having an aromatic ketone group includes 4-benzoylphenyl (meth)acrylate, 4-(meth)acryloyloxyethoxybenzophenone, 4-(meth)acryloyloxy-4'-methoxybenzophenone, 4-(meth) acryloyloxyethoxy-4'-methoxybenzophenone, 4-(meth) acryloyloxy-4'-bromobenzophenone and/or 4-acryloyloxyethoxy-4'-bromobenzophenone, and the like, but is not limited thereto.

The (meth)acryloyl group in the unit of Formula 2 means a (meth)acryloyl group that induces free radical polymerization when exposed to electromagnetic waves in the presence of an appropriate radical initiator, or a substituent comprising the same. Such a (meth)acryloyl group may act similarly to the aromatic ketone group by irradiation with electromagnetic waves.

The unit of Formula 2 in which $R_3$ is a (meth)acryloyl group, for example, may be formed by preparing a precursor copolymer and then further reacting it with an unsaturated reagent compound to introduce a (meth)acryloyl group. Typically, the introduction of the (meth)acryloyl group involves (1) a reaction between a nucleophilic group on the precursor copolymer and an electrophilic group on the unsaturated reagent compound (i.e., the unsaturated reagent compound contains both an electrophilic group and a (meth) acryloyl group), or (2) a reaction between an electrophilic group on the precursor copolymer and a nucleophilic group on the unsaturated reagent compound (i.e., the unsaturated reagent compound contains both nucleophilic groups and (meth)acryloyl groups). These reactions between nucleophilic groups and electrophilic groups are typically ring opening reactions, addition reactions or condensation reactions.

In this case, the precursor copolymer has a hydroxy, carboxylic acid (—COOH), or anhydride (—O—(CO)—O—) group. When the precursor copolymer has a hydroxyl group, the unsaturated reagent compound often has a carboxylic acid (—COOH), isocyanato (—NCO), epoxy (i.e., oxiranyl) or anhydride group in addition to the (meth) acryloyl group. When the precursor copolymer has a carboxylic acid group, the unsaturated reagent compound often has a hydroxy, amino, epoxy, isocyanato, aziridinyl, azetidinyl or oxazolinyl group in addition to the (meth)acryloyl group. When the precursor (meth)acrylate copolymer has an anhydride group, the unsaturated reagent compound often has a hydroxy or amine group in addition to the (meth) acryloyl group.

In one example, the precursor copolymer may have a carboxylic acid group and the unsaturated reagent compound may have an epoxy group. In an exemplary unsaturated reagent compound, for example, glycidyl (meth)acrylate and 4-hydroxybutyl acrylate glycidyl ether are included. In another example, the precursor copolymer has an anhydride group, and reacts with an unsaturated reagent compound which is a hydroxy-substituted alkyl (meth)acrylate, such as 2-hydroxyethyl (meth)acrylate, 3-hydroxypropyl (meth)acrylate, and the like. In another example, the precursor copolymer has a hydroxy group and the unsaturated reagent compound has an isocyanato group and a (meth) acryloyl group. Such an unsaturated reagent compound comprises an isocyanatoalkyl (meth)acrylate, such as isocyanatoethyl (meth)acrylate, but is not limited thereto.

In one example, the (meth)acryloyl group may be represented by the formula $CH_2{=}CHR^{1-}(CO)$-Q-L- (wherein, L is a linking group and Q is oxy (—O—) or —NH—). Here, L comprises alkylene, arylene, or a combination thereof, and further comprises —O—, —O—(CO)—, —NH—(CO)—, —NH—, or a combination thereof, optionally depending on the precursor copolymer and the specific unsaturated reagent compound, which are reacted to form the (meth)acryloyl group. In some specific examples, the (meth)acryloyl group is $H_2C{=}CHR^{1-}(CO)$—O—$R^6$—NH—(CO)—O—$R^{5-}$O—(CO)—, which is formed by a reaction of a hydroxy-containing group of the precursor copolymer represented by the formula —(CO)—O—$R^5$—OH and the unsaturated reagent compound which is an isocyanatoalkyl (meth)acrylate represented by the formula $H_2C{=}CHR^{1-}(CO)$—O—$R^{6-}$NCO. Here, $R^5$ and $R^6$ are each independently an alkylene group, for example, alkylene having 1 to 10 carbon atoms, 1 to 6 carbon atoms, or 1 to 4 carbon atoms. In addition, here, $R_1$ is methyl or hydrogen.

In the unit of Formula 2, $R_1$ may be hydrogen or an alkyl group with 1 to 4 carbon atoms, and specifically, may be hydrogen, or a methyl or ethyl group.

The unit of Formula 2, when included, may be included in the acrylic copolymer in a ratio of about 0.001 to 5 parts by weight relative to 100 parts by weight of the alkyl (meth)acrylate unit, and under this ratio, it is possible to effectively form the desired pressure-sensitive adhesive layer by irradiation of electromagnetic waves.

In another example, the ratio of the unit of Formula 2 may be approximately 0.003 parts by weight or more, 0.005 parts by weight or more, 0.007 parts by weight or more, 0.009 parts by weight or more, 0.01 parts by weight or more, 0.015 parts by weight or more, 0.02 parts by weight or more, 0.025 parts by weight or more, 0.03 parts by weight or more, 0.035 parts by weight or more, 0.04 parts by weight or more, 0.045 parts by weight or more, 0.05 parts by weight or more, 0.055 parts by weight or more, 0.06 parts by weight or more, 0.065 parts by weight or more, 0.07 parts by weight or more, 0.075 parts by weight or more, 0.08 parts by weight or more, 0.085 parts by weight or more, 0.09 parts by weight or more, 0.1 parts by weight or more, or may also be 4.5 parts by weight or less, 4 parts by weight or less, 3.5 parts by weight or less, 3 parts by weight or less, 2.5 parts by weight or less, 2 parts by weight or less, 1.5 parts by weight or less, 1 part by weight or less, 0.5 parts by weight or less, 0.3 parts by weight or less, 0.1 parts by weight or less, 0.08 parts by weight or less, 0.06 parts by weight or less, 0.04 parts by weight or less, or 0.02 parts by weight or less or so, relative to 100 parts by weight of the alkyl (meth)acrylate unit, and under this ratio, it is possible to effectively form the desired pressure-sensitive adhesive layer by irradiation of electromagnetic waves.

The acrylic copolymer may appropriately contain other monomer units in addition to the above-described monomer units, as long as the purpose is not impaired (for example, the crystallinity of the copolymer is not impaired).

In one example, the acrylic copolymer included in the pressure-sensitive adhesive may be a crystalline acrylic copolymer. As described above, the term crystalline copolymer means a copolymer whose melting point is identified in a predetermined range in the DSC (Differential Scanning calorimeter) measurement method described in Examples of this specification.

In one example, as the acrylic copolymer, a crystalline acrylic copolymer having a melting point of approximately −20° C. or less or so, which is identified in the above manner, may be used. In another example, the melting point of the crystalline acrylic copolymer may be about −25° C. or less, −30° C. or less, −35° C. or less, or −40° C. or less, or may also be −100° C. or more, −95° C. or more, −90° C. or more, −85° C. or more, −80° C. or more, −75° C. or more, −70° C. or more, −65° C. or more, −60° C. or more, −55° C. or more, −50° C. or more, or −45° C. or more or so. The acrylic copolymer having such a melting point may form the desired pressure-sensitive adhesive effectively.

The specific composition of the crystalline acrylic copolymer is not particularly limited. In one example, the crystalline acrylic copolymer may be a copolymer including at least the above-described three types of units (alkyl (meth) acrylate unit, unit of Formula 1, and polar functional group-containing unit). However, all the above-described acrylic copolymers do not exhibit crystallinity. In order for the acrylic copolymer to exhibit crystallinity, it is necessary to include at least 60 parts by weight or more of the unit of Formula 1 among the above-described units, relative to 100 parts by weight of the alkyl (meth)acrylate unit. In another example, the ratio of the unit of Formula 1 in the crystalline acrylic copolymer may be 65 parts by weight or more, 70 parts by weight or more, 75 parts by weight or more, 80 parts by weight or more, 85 parts by weight or more, 90 parts by weight or more, 95 parts by weight or more, or 100 parts by weight or more, or may also be 2000 parts by weight or less, 1500 parts by weight or less, 1000 parts by weight or less, 900 parts by weight or less, 800 parts by weight or less, 700 parts by weight or less, 650 parts by weight or less, 600 parts by weight or less, 550 parts by weight or less, 500 parts by weight or less, 450 parts by weight or less, 400 parts by weight or less, 350 parts by weight or less, 300 parts by weight or less, 250 parts by weight or less, 200 parts by weight or less, or 150 parts by weight or less or so, relative to 100 parts by weight of the alkyl (meth)acrylate unit.

In the crystalline acrylic copolymer, the ratio (A/B) of the weight (A) of the unit of Formula 1 to the weight (B) of the polar functional group-containing unit may be 1.5 or more, or more than 1.5. In another example, the ratio (A/B) may be 1.7 or more, 1.9 or more, 2.1 or more, 2.3 or more, 2.5 or more, 2.7 or more, 2.9 or more, 3.1 or more, 3.3 or more, 3.5 or more, 3.7 or more, or 3.9 or more, or may also be 10 or less, 9 or less, 8 or less, 7 or less, 6 or less, 5 or less, 4 or less, 3 or less, 2.5 or less, or 2 or less or so. Also, in the crystalline acrylic copolymer, the polar functional group-containing unit may be a hydroxyl group-containing unit. In one example, a hydroxyalkyl (meth)acrylate having a hydroxyalkyl group with 3 or more, or 4 or more carbon atoms may suitably form the crystalline acrylic copolymer. Although the reason is not clear, it is thought that the interaction between the alkyl group ($R_2$) of the unit of Formula 1 and the hydroxyalkyl group contributes to the expression of crystallinity of the acrylic copolymer.

In the crystalline acrylic copolymer, the alkyl (meth) acrylate unit may be included in a ratio within the range of about 20 to 70 weight %. In another example, the ratio of the alkyl (meth)acrylate unit may be 25 weight % or more, 30 weight % or more, 35 weight % or more, 40 weight % or more, or 45 weight % or more, or may also be 65 weight % or less, 60 weight % or less, 55 weight % or less, 50 weight % or less, or 45 weight % or less or so. Within this range, it is possible to effectively form the desired pressure-sensitive adhesive layer.

Although the reason is not clear, it is thought that the crystallinity is provided to the acrylic copolymer and the melting point is identified by the interaction or regularity of the respective monomer units contained in the ratio.

As the acrylic copolymer, a copolymer having a weight average molecular weight of 1,000,000 or more may be used. In this specification, the weight average molecular weight means a polystyrene conversion value measured by GPC (gel permeation chromatography). In addition, unless otherwise specified, the unit of the weight average molecular weight is g/mol.

In one example, the weight average molecular weight may be 1,100,000 or more, 1,200,000 or more, 1,300,000 or more, 1,400,000 or more, 1,500,000 or more, 1,600,000 or more, 1,700,000 or more, 1,800,000 or more, 1,900,000 or more, or 2,000,000 or more, or may also be 5,000,000 or less, 4,000,000 or less, 3,000,000 or less, 2,500,000 or less, or 2,000,000 or less or so.

The lower the weight average molecular weight of the copolymer, the greater the change in physical properties after cross-linking, but if the weight average molecular weight is too low, it is disadvantageous in terms of durability under high temperature and/or high humidity conditions. However, in the case of the present application, by using the above-described specific copolymers, it is possible to effectively form the desired pressure-sensitive adhesive layer even in a state where the weight average molecular weight is maintained at an appropriate level.

The pressure-sensitive adhesive layer may further comprise a cross-linking agent. The cross-linking agent may react with the acrylic copolymer to implement a cross-linked structure.

The type of the cross-linking agent is not particularly limited, and for example, a general cross-linking agent such as an isocyanate-based compound, an epoxy-based compound, an aziridine-based compound, and a metal chelate-based compound may be used. This type of cross-linking agent is a so-called thermal cross-linking agent that implements a cross-linked structure by application of heat, and is different from a radical cross-linking agent to be described below. A specific example of the isocyanate-based compound may include one or more selected from the group consisting of tolylene diisocyanate, xylene diisocyanate, diphenylmethane diisocyanate, hexamethylene diisocyanate, isoborone diisocyanate, tetramethylxylene diisocyanate, naphthalene diisocyanate, and a reactant product of any one of the foregoing with a polyol (e.g., trimethylol propane): a specific example of the epoxy-based compound may include one or more selected from the group consisting of ethylene glycol diglycidyl ether, triglycidyl ether, trimethylolpropane triglycidyl ether, N,N,N',N'-tetraglycidyl ethylenediamine and glycerin diglycidyl ether; and a specific example of the aziridine-based compound may include one or more selected from the group consisting of N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine), and tri-1-aziridinylphosphine oxide, without being limited thereto. In addition, here, a specific example of the metal chelate-based compound may include a compound in which a polyvalent metal such as aluminum, iron, zinc, tin, titanium, antimony, magnesium and/or vanadium is coordinated with acetyl acetone or ethyl acetoacetate, and the like, but is not limited thereto.

In the pressure-sensitive adhesive layer, the cross-linking agent may be included in an amount of 0.01 parts by weight to 10 parts by weight or 0.01 parts by weight to 5 parts by weight relative to 100 parts by weight of the acrylic copolymer. In the above range, it may be adjusted in consideration of the cohesive force and durability of the pressure-sensitive adhesive layer, and the like. In one example, the ratio of the cross-linking agent may be about 0.02 parts by weight or more, about 0.03 parts by weight or more, about 0.04 parts by weight or more, about 0.05 parts by weight or more, 0.06 parts by weight or more, 0.07 parts by weight or more, 0.08 parts by weight or more, or 0.09 parts by weight or more, or may also be about 9 parts by weight or less, 8 parts by weight or less, 7 parts by weight or less, 6 parts by weight or less, 5 parts by weight or less, 4 parts by weight or less, about 3 parts by weight or less, about 2 parts by weight or less, about 1 part by weight or less, about 0.8 parts by weight or less, about 0.6 parts by weight or less, about 0.4 parts by weight or less, about 0.2 parts by weight or less, about 0.15 parts by weight or less, about 0.1 parts by weight or less, 0.09 parts by weight or less, 0.08 parts by weight or less, or 0.07 parts by weight or less or so.

When the content of the cross-linking agent is selected to cross-link the acrylic copolymer at an appropriate level within the content range, it is possible to effectively form the desired pressure-sensitive adhesive.

The pressure-sensitive adhesive layer may comprise, as the cross-linking agent, a so-called radical cross-linking agent which is a cross-linking agent of a different type from the thermal cross-linking agent. Such a cross-linking agent implements a cross-linked structure by radical reaction. Such a radical cross-linking agent may be exemplified by a so-called polyfunctional acrylate, which may include, for example, bifunctional acrylates such as 1,4-butanediol di(meth)acrylate, 1,6-hexanediol di(meth)acrylate, neopentylglycol di(meth)acrylate, polyethylene glycol di(meth) acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecanedimethanol (meth)acrylate, dimethylol dicyclopentane di(meth) acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate or 9,9-bis[4-(2-acryloyloxyethoxy)phenyl]fluorene: trifunctional acrylates such as trimethylolpropane tri(meth)acrylate, dipentaerythritol tri (meth)acrylate, propionic acid-modified dipentaerythritol tri (meth)acrylate, pentaerythritol tri(meth)acrylate, propylene oxide-modified trimethylolpropane tri(meth)acrylate, trifunctional urethane (meth)acrylate, or tris(meth)acryloxyethyl isocyanurate: tetrafunctional acrylates such as diglycerin tetra(meth)acrylate or pentaerythritol tetra(meth) acrylate: pentafunctional acrylates such as propionic acid-modified dipentaerythritol penta(meth)acrylate; and hexafunctional acrylates such as dipentaerythritol hexa(meth)acrylate, caprolactone-modified dipentaerythritol hexa (meth)acrylate or urethane (meth)acrylate (e.g., a reactant product of an isocyanate monomer and trimethylol propane tri(meth)acrylate, etc.), and the like, but is not limited thereto.

The radical cross-linking agent in the pressure-sensitive adhesive layer may also be present in an appropriate ratio depending on the purpose, which may be included, for example, in an amount of 0.01 parts by weight to 10 parts by weight or 0.01 parts by weight to 5 parts by weight relative to 100 parts by weight of the acrylic copolymer.

The radical cross-linking agent does not correspond to an essential component.

In addition to the above components, the pressure-sensitive adhesive may comprise appropriate additional components as needed, which may also comprise, for example, components of a radical initiator, an ultraviolet absorber, a light stabilizer, a plasticizer, and/or a cross-linking catalyst, and the like.

In the present application, a method of forming the pressure-sensitive adhesive is not particularly limited. For example, the pressure-sensitive adhesive may be formed by applying the pressure-sensitive adhesive composition, in which the respective components (the copolymer and cross-linking agent, etc.) to form the pressure-sensitive adhesive are compounded, with an appropriate cross-linking method in consideration of the type of the applied acrylic copolymer and/or cross-linking agent. For example, if the acrylic copolymer and/or cross-linking agent is a type cross-linked by application of heat, a cross-linked product may be formed by applying appropriate heat, and if it is a type cross-linked by irradiation with electromagnetic waves, a cross-linked product may be formed by irradiation with appropriate electromagnetic waves, and other cross-linking methods may also be applied.

Such a pressure-sensitive adhesive may exhibit the above-described elastic modulus and/or peel force characteristics.

The thickness of such a pressure-sensitive adhesive of the present application is not particularly limited, and it may have a thickness of a conventional pressure-sensitive adhesive in consideration of the applied use.

For example, the pressure-sensitive adhesive may have an appropriate level of thickness within the range of approximately 5 μm to 100 μm.

The present application also relates to a pressure-sensitive adhesive film or an optical laminate, which comprises a base film and a pressure-sensitive adhesive layer formed on one or both sides of the base film. In the case of the optical laminate, the base film may be an optical film. The pressure-sensitive adhesive layer may comprise the above-described pressure-sensitive adhesive.

The pressure-sensitive adhesive layer of the present application may be formed on one or both sides of the base film to form a pressure-sensitive adhesive film, or may be formed on one or both sides of the base film, which is an optical film, to form an optical laminate.

At this time, the type of the applicable base film is not particularly limited. As the base film, a base film which is applicable to the formation of the pressure-sensitive adhesive film may be usually applied.

For example, as the base film, a PET (poly(ethylene terephthalate)) film, a PTFE (poly(tetrafluoroethylene)) film, a PP (polypropylene) film, a PE (polyethylene) film, a polyamide film, a COP (cyclic olefin polymer) film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film and/or a polyimide film, and the like may be used, without being limited thereto.

The thickness of the base film is not particularly limited, and it may have an appropriate thickness within a range suitable for the purpose.

When the optical film is applied as the base film, there is no particular limitation on the type of the optical film. In one example, the optical film may be a polarizing film, a polarizing plate, or a retardation film, and the like. Even in this case, the optical film may have a thickness in an appropriate range depending on the purpose.

The pressure-sensitive adhesive film or the optical laminate may further comprise a release film or a protective film for protecting the pressure-sensitive adhesive layer until use, if necessary.

The present application also relates to a flexible device comprising the pressure-sensitive adhesive layer, the pressure-sensitive adhesive film, or the optical laminate, which comprises the pressure-sensitive adhesive. In the device, there is no particular limitation on the application form of the pressure-sensitive adhesive layer, the pressure-sensitive adhesive film, or the optical laminate, which comprises the pressure-sensitive adhesive. For example, the pressure-sensitive adhesive layer may be used for the application of a so-called OCA (Optically Clear Adhesive) or OCR (Optically Clear Resin) in the device, and thus the application form of the pressure-sensitive adhesive layer, the pressure-sensitive adhesive film, or the optical laminate may be the same as the application form of the conventional OCA or OCR.

In this case, in one example, the flexible device may comprise a display panel and the pressure-sensitive adhesive layer, pressure-sensitive adhesive film, or optical laminate present on one or both sides of the display panel. In this case, the display panel may be configured to be folded or rolled through one or more folding shafts or rolling shafts.

Other elements constituting such a flexible device are not particularly limited, where well-known components of the flexible device may be employed without limitation.

Advantageous Effects

The present application may provide a pressure-sensitive adhesive, which is applied to a flexible device, thereby effectively responding to repeated deformation and recovery, causing no defects (for example, observation of deformation traces and the like) before and after deformation, having excellent cuttability and workability, and causing no lifting, delamination, and/or bubble generation.

The present application may also provide a pressure-sensitive adhesive layer comprising the pressure-sensitive adhesive, and a pressure-sensitive adhesive film or optical film, and a flexible device such as a foldable device or a rollable device, which comprise the same.

Figure 1:
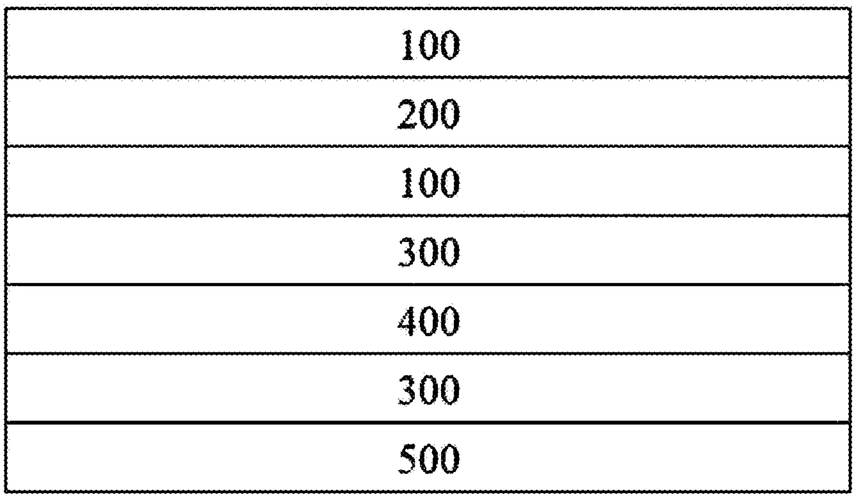
FIG. 1 is a diagram showing a structure of a specimen applied in a dynamic folding test.

Hereinafter, the present application will be described in detail through Examples, but the scope of the present application is not limited by Examples below.

1. Evaluation of Storage Elastic Modulus

The storage elastic modulus was evaluated using ARES G2 (Advanced Rheometric Expansion System G2) (TA). A specimen was prepared by cutting a pressure-sensitive adhesive layer having a thickness of about 0.8 mm or so into a circle having a diameter of about 8 mm or so. The pressure-sensitive adhesive layer was prepared by overlapping pressure-sensitive adhesive layers having a thickness of about 25 μm or so to have a thickness of about 0.8 mm or so. The storage elastic modulus at the measurement temperature was evaluated for the specimen using a parallel plate fixture having a diameter of about 8 mm. Upon the evaluation, the evaluation conditions were set to a frequency of 1 Hz and a strain of 5%.

2. Peel Force Evaluation

A specimen was prepared by cutting the pressure-sensitive adhesive film to be measured (the structure of the release film/pressure-sensitive adhesive layer/base film) into a rectangle having a width of about 25 mm or so and a length of about 100 mm or so. Subsequently, the release film was peeled off, and the pressure-sensitive adhesive layer was attached to a soda lime glass according to JIS Z 0237 using a roller of 2 kg and left at room temperature for 1 day. Thereafter, the peel force was measured using a TA (Texture Analyzer) instrument (Stable Micro System), while peeling the pressure-sensitive adhesive layer at a peel angle of 180 degrees and a peel rate of 0.3 m/min at room temperature.

3. Evaluation of Melting Point and Glass Transition Temperature

A melting point of a copolymer was measured according to a measurement method using a conventional DSC (Differential Scanning calorimeter) equipment. As the equipment, DSC-STAR3 equipment (Mettler Toledo) was used. About 10 mg of the sample (copolymer) was sealed in a dedicated pan, and the melting point and the glass transition temperature were measured by setting the warming condition to 10° C./min and the cooling condition to −10° C./min, and identifying endothermic and exothermic heat quantities depending on the temperature in an $N_2$ atmosphere. The measurement temperature range was −120° C. to 200° C. Regarding the conditions, first, it was cooled from room temperature (about 30° C.) to −120° C. at a rate of about −10° C./min, and heated again to 200° C. at a temperature increase rate of 10° C./min (primary heating). Thereafter, it was cooled to −120° C. at a rate of about −10° C./min again, and heated again to 200° C. at a temperature increase rate of 10° C./min (secondary heating).

The melting point and the glass transition temperature were evaluated upon the second heating.

4. Evaluation of Weight Average Molecular Weight

The weight average molecular weight (Mw) of the copolymer was measured using GPC (Gel Permeation Chromatograph), and the measurement conditions are as follows. When measuring the weight average molecular weight, the measurement results were converted using standard polystyrene (manufactured by Aglient System) to prepare the calibration curve.

<GPC Measurement Conditions>

Measuring instrument: Aglient GPC (Aglient 1200 series, U.S.)

Column: connecting two PL Mixed B

Column temperature: 40° C.

Eluent: THF (tetrahydrofuran)

Flow rate: 1.0 μL/min

Concentration: ~1 mg/mL (100 μl injection)

5. Dynamic Folding Test

Figure 2:
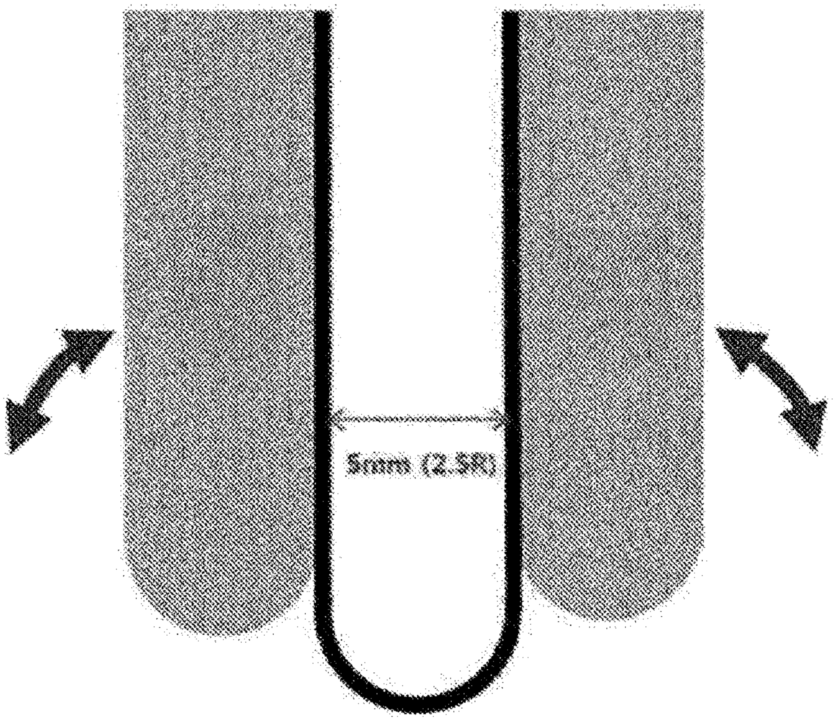
FIG. 2 is a diagram showing a process in which a dynamic folding test is performed.

A dynamic folding test was performed by preparing a specimen as shown in FIG. 1. A laminate prepared by sequentially laminating a polyimide film (200) having a thickness of about 50 μm or so in which hard coating layers (100) were formed on both sides, a pressure-sensitive adhesive layer (300), a polarizing plate (400), a pressure-sensitive adhesive layer (300), and a display panel (500) as in the specimen as shown in FIG. 1 was cut into a rectangular shape having a horizontal length of about 7.8 cm and a vertical length of about 17 cm or so to prepare the specimen. Subsequently, as shown in FIG. 2, the folding that the specimen was sandwiched between parallel plates with an interval of 5 mm and folded was repeated 200,000 times at 25° C., and the sample was collected, and then defects such as bubble generation, occurrence of lifting/delamination, occurrence of cracks in the coating layer were visually observed. A case in which even one of the above defects occurred was evaluated as NG, and a case in which all the above defects did not occur was evaluated as PASS.

PREPARATION EXAMPLE 1. PREPARATION OF COPOLYMER (A)

2-ethylhexyl acrylate (2-EHA), lauryl acrylate (LA) and 4-hydroxybutyl acrylate (HBA) were introduced to ethyl acetate as a solvent in a reactor in a weight ratio of 40:40:20 (2-EHA:LA:HBA), and about 500 ppm of a radical initiator (2,2'-azobis(4-methoxy-2,4-dimethylvaleronitrile)) was added thereto, and then subjected to polymerization reaction at about 62° C. for 8 hours to prepare a polymerized product (copolymer (A)).

The copolymer (polymerized product) (A) exhibited a melting point within a range of approximately −44° C. or so.

PREPARATION EXAMPLES 2 TO 11. PREPARATION OF COPOLYMER

Copolymers (polymerized products) were prepared in the same manner as in Preparation Example 1, except that the weight ratios of the applied monomers and the weight average molecular weights of the polymerized products (copolymers) were changed as shown in Table 1 below.

TABLE 1

| | Copolymer | 2-EHA | LA | HBA | Mw (10000) | Tm |
|---|---|---|---|---|---|---|
| Preparation Example 1 | A | 40 | 40 | 20 | 198 | −44 |
| Preparation Example 2 | B | 35 | 50 | 15 | 203 | −42~−48 |
| Preparation Example 3 | C | 40 | 50 | 10 | 196 | −42~−48 |
| Preparation Example 4 | D | 45 | 40 | 15 | 195 | −42~−48 |
| Preparation Example 5 | E | 50 | 35 | 15 | 196 | −38~−34 |
| Preparation Example 6 | F | 50 | 40 | 10 | 201 | −38~−34 |
| Preparation Example 7 | G | 55 | 35 | 10 | 204 | −38~−34 |
| Preparation Example 8 | H | 80 | — | 20 | 195 | — |
| Preparation Example 9 | I | 90 | — | 10 | 208 | — |
| Preparation Example 10 | J | 10 | 70 | 20 | 197 | — |
| Preparation Example 11 | K | 48 | 50 | 2 | 195 | — |

2-EHA: 2-ethylhexyl acrylate
LA: lauryl acrylate
HBA: 4-hydroxybutyl acrylate
Mw: weight average molecular weight (unit: g/mol)
Tm: melting point (unit: ° C.)

EXAMPLE 1

A pressure-sensitive adhesive composition was prepared by compounding about 0.07 parts by weight of an isocyanate cross-linking agent (xylylene diisocyanate) and 0.005 parts by weight of a catalyst relative to 100 parts by weight of the copolymer (polymerized product) (A) of Preparation Example 1. As the catalyst, a catalyst for accelerating the urethane reaction of the hydroxyl group and the isocyanate group was typically used. The prepared pressure-sensitive adhesive composition was applied on a base film (PET (poly(ethylene terephthalate)) film) with a comma coater, and maintained at 140° C. for about 3 minutes or so to form a pressure-sensitive adhesive layer having a thickness of about 25 μm or so.

EXAMPLES 2 TO 11 AND COMPARATIVE EXAMPLES 1 to 4

Pressure-sensitive adhesive compositions and pressure-sensitive adhesive layers were prepared in the same manner as in Example 1, except that the types of the applied copolymers and the ratios of the cross-linking agent and the catalyst were changed as shown in Table 2 below. At this time, the same kind as in Example 1 was used as the cross-linking agent and catalyst. In Table 2 below, the ratio of the cross-linking agent to the catalyst is parts by weight relative to 100 parts by weight of the copolymer.

TABLE 2

| | | Type of copolymer | Cross-linking agent ratio | Catalyst ratio |
|---|---|---|---|---|
| Example | 1 | Preparation Example 1 | 0.07 | 0.005 |
| | 2 | Preparation Example 2 | 0.07 | 0.005 |
| | 3 | Preparation Example 3 | 0.07 | 0.005 |
| | 4 | Preparation Example 4 | 0.07 | 0.005 |
| | 5 | Preparation Example 4 | 0.09 | 0.005 |
| | 6 | Preparation Example 5 | 0.07 | 0.005 |
| | 7 | Preparation Example 5 | 0.09 | 0.005 |
| | 8 | Preparation Example 6 | 0.07 | 0.005 |
| | 9 | Preparation Example 6 | 0.09 | 0.005 |
| | 10 | Preparation Example 7 | 0.07 | 0.005 |
| | 11 | Preparation Example 7 | 0.09 | 0.005 |
| Comparative | 1 | Preparation Example 8 | 0.07 | 0.005 |
| Example | 2 | Preparation Example 9 | 0.07 | 0.005 |
| | 3 | Preparation Example 10 | 0.07 | 0.005 |
| | 4 | Preparation Example 11 | 0.07 | 0.005 |

The results of the storage elastic modulus, peel force, and dynamic folding test evaluated for the pressure-sensitive adhesive layers of Examples and Comparative Examples above are summarized in Table 3 below.

In Table 3 below, the unit of storage elastic modulus is Pa, and the unit of peel force is gf/inch. Also, in Table 3 below, the elastic modulus change rate is a physical quantity identified by Equation 1 above.

TABLE 3

| | | Storage elastic modulus (−20° C., Pa) | Storage elastic modulus (25° C., Pa) | Elastic modulus change rate (Equation 1) | Peel force (25° C., gf/inch) | Dynamic folding |
|---|---|---|---|---|---|---|
| Example | 1 | 89614 | 23937 | 1459.5 | 1689 | PASS |
| | 2 | 58478 | 17517 | 910.2 | 1385 | PASS |
| | 3 | 52907 | 17055 | 796.7 | 1376 | PASS |
| | 4 | 85787 | 22923 | 1397 | 1786 | PASS |
| | 5 | 80253 | 22876 | 1275 | 1577 | PASS |
| | 6 | 92579 | 39662 | 1175.9 | 1794 | PASS |
| | 7 | 96776 | 41418 | 1230.2 | 1562 | PASS |
| | 8 | 68500 | 22110 | 1030.9 | 1672 | PASS |
| | 9 | 68453 | 22090 | 1030.3 | 1530 | PASS |
| | 10 | 79196 | 37500 | 926.6 | 1594 | PASS |
| | 11 | 81271 | 40327 | 909.9 | 1420 | PASS |
| Comparative | 1 | 224751 | 45046 | 3993.4 | 1879 | NG |
| Example | 2 | 360226 | 98987 | 5805.3 | 1418 | NG |
| | 3 | 194526 | 43153 | 3363.8 | 1526 | NG |
| | 4 | 42809 | 16976 | 574.1 | 309 | NG |

The invention claimed is:

1. A pressure-sensitive adhesive, comprising:

a cross-linked crystalline acrylic copolymer, wherein the pressure-sensitive adhesive has a storage elastic modulus of 100,000 Pa or less at −20° C., and wherein the pressure-sensitive adhesive has a room-temperature peel force of at least 500 gf/inch with respect to glass.

2. The pressure-sensitive adhesive according to claim 1, wherein the pressure-sensitive adhesive has an elastic modulus change rate according to Equation 1 below of 2500 or less:

$$\text{Elastic modulus change rate}=(M_{20}-M_{25})/45 \qquad \text{[Equation 1]}$$

wherein $M_{20}$ is a storage elastic modulus of the pressure-sensitive adhesive at −20° C., and $M_{25}$ is a storage elastic modulus of the pressure-sensitive adhesive at 25° C.

3. The pressure-sensitive adhesive according to claim 1, wherein the storage elastic modulus at 25° C. is at least 10,000 Pa.

4. The pressure-sensitive adhesive according to claim 1, wherein the acrylic copolymer has a melting point of −20° C. or less.

5. The pressure-sensitive adhesive according to claim 1, wherein the acrylic copolymer comprises an alkyl (meth) acrylate unit, a unit of Formula 1 below, and a polar functional group-containing unit:

[Formula 1]

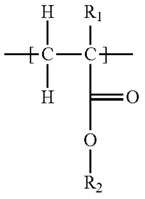

wherein $R_1$ represents hydrogen or an alkyl group, and $R_2$ represents an alkyl group with 11 to 13 carbon atoms.

6. The pressure-sensitive adhesive according to claim 5, wherein the alkyl (meth)acrylate unit has a linear or branched alkyl group having 1 to 10 carbon atoms.

7. The pressure-sensitive adhesive according to claim 5, wherein the polar functional group-containing unit is a unit derived from a hydroxyl group-containing monomer.

8. The pressure-sensitive adhesive according to claim 5, wherein the acrylic copolymer comprises the alkyl (meth) acrylate unit in an amount of 25 to 65 weight %.

9. The pressure-sensitive adhesive according to claim 5, wherein the acrylic copolymer comprises 50 to 300 parts by weight of the unit of Formula 1 relative to 100 parts by weight of the alkyl (meth)acrylate unit.

10. The pressure-sensitive adhesive according to claim 5, wherein the acrylic copolymer comprises 10 to 100 parts by weight of the polar functional group-containing unit relative to 100 parts by weight of the alkyl (meth)acrylate unit.

11. The pressure-sensitive adhesive according to claim 5, wherein the unit of Formula 1 is comprised in the crystalline acrylic copolymer in an amount of 60 parts by weight or more relative to 100 parts by weight of the alkyl (meth) acrylate unit, and wherein a ratio of a weight (A) of the unit of Formula 1 relative to a weight (B) of the polar functional group-containing unit is at least 1.5.

12. A pressure-sensitive adhesive film, comprising:

a base film; and a pressure-sensitive adhesive layer formed on one or both sides of the base film, wherein the pressure-sensitive adhesive layer comprises the pressure-sensitive adhesive of claim 1.

13. A flexible device, comprising:

a display panel configured to be foldable or rollable through at least one folding axis or at least one rolling axis; and a pressure-sensitive adhesive layer on one or both sides of the display panel, wherein the pressure-sensitive adhesive layer comprises the pressure-sensitive adhesive of claim 1.

* * * * *